(12) United States Patent
Rüegg et al.

(10) Patent No.: US 8,396,095 B2
(45) Date of Patent: Mar. 12, 2013

(54) METHOD FOR DECODING A COMPOSITE RADIO SIGNAL AND CORRESPONDING RECEIVER

(75) Inventors: Andreas Rüegg, Stuttgart (DE); Joerg Schaepperle, Stuttgart (DE)

(73) Assignee: Alcatel Lucent, Paris (FR)

( * ) Notice: Subject to any disclaimer, the term of this patent is extended or adjusted under 35 U.S.C. 154(b) by 850 days.

(21) Appl. No.: 12/492,562

(22) Filed: Jun. 26, 2009

(65) Prior Publication Data

US 2010/0002756 A1 Jan. 7, 2010

(30) Foreign Application Priority Data

Jun. 27, 2008 (EP) .................................... 08305338

(51) Int. Cl.
*H04B 1/00* (2006.01)

(52) U.S. Cl. ........ 375/144; 375/148; 375/346; 375/349; 455/63.1; 455/67.13; 455/303

(58) Field of Classification Search .................. 375/140, 375/141, 144, 147, 148, 259, 260, 340, 346, 375/349; 455/63.1, 67.11, 67.13, 226.1–226.4, 455/296, 303

See application file for complete search history.

(56) References Cited

U.S. PATENT DOCUMENTS

| | | | | |
|---|---|---|---|---|
| 6,298,050 | B1 * | 10/2001 | van Heeswyk et al. | 370/335 |
| 8,059,739 | B2 * | 11/2011 | Jonsson | 375/262 |
| 2005/0157809 | A1 | 7/2005 | Yuk | |
| 2007/0230382 | A1 | 10/2007 | Ding et al. | |
| 2009/0323777 | A1 * | 12/2009 | Wang et al. | 375/148 |
| 2010/0061496 | A1 * | 3/2010 | Black et al. | 375/346 |

FOREIGN PATENT DOCUMENTS

WO WO 2006/104928 A2 10/2006

OTHER PUBLICATIONS

Sergio Verdu, "Multiuser Detection: Chapter 7—Decision-Driven Multiuser Detectors," (online), Cambridge University Press, XP002517200, pp. 344, 346, 348-349, (Jan. 1, 1998).
Slimane, S.B. et al., "An Improved Successive Interference Cancellation Multiuser Detector for Narrowband Signals," Vehicular Technology Conference, 2005, VTC 2005-Spring, 2005 IEEE 61$^{st}$, IEEE, Piscataway, NJ, USA, vol. 2, XP010855554, pp. 973-977, (May 30, 2005).
Thomas T. A. et al., "Modulation and Coding Rate Selection to Improve Successive Cancellation Reception in OFDM and Spread OFDM MIMI Systems," ICC 2003, IEEE International Conference on Communications vol. 4, XP010642964, pp. 2842-2846, (May 5, 2003).
European Search Report.

* cited by examiner

*Primary Examiner* — Dac Ha
(74) *Attorney, Agent, or Firm* — Fay Sharpe LLP

(57) ABSTRACT

The present invention relates to a method for decoding a composite radio signal at a receiver in an OFDM based radio communication system, said composite radio signal being a superposition of at least two signals sent by at least one transmitter, each signal having signal properties, in particular modulation scheme, coding scheme, said at least two signals being transmitted using the same radio resource on a set of frequency subchannels of said OFDM system.
According to the present invention, the method comprises the steps of:
gathering at said receiver information on said signal properties of the respective signals comprised in said composite radio signal;
selecting, depending on said signal properties of said respective signals, the signal to be decoded first out of said composite radio signal;
decoding said signal to be decoded first according to its signal properties, and
subtracting the contribution of said signal to be decoded first from said composite radio signal.

20 Claims, 2 Drawing Sheets

METHOD FOR DECODING A COMPOSITE RADIO SIGNAL AND CORRESPONDING RECEIVER

The invention is based on a priority application EP 08 305 338.9 which is hereby incorporated by reference.

TECHNICAL FIELD

The present invention relates to a method for decoding a radio signal consisting of a superposition of at least two signals.

BACKGROUND OF THE INVENTION

Orthogonal Frequency Division Multiplexing (OFDM) based networks use a multi-carrier transmission technique and are foreseen to be used as access technology in the fourth generation of wireless/mobile communication networks thanks to their ability especially in combination with MIMO antenna technology to reach very high bit rates. OFDM offers a sensible alternative for high-speed mobile applications, and thus represents an important step for next generation mobile radio systems or for a $4^{th}$ generation air interface to be defined in 3G LTE and 802.16m.

In multi-carrier systems as OFDM transmission system, the transmitted data is split into a number of parallel data streams, each one used to modulate a separate sub-carrier. In other words, the broadband radio channel is subdivided into a plurality of narrow-band subchannels or sub-carriers being independently modulated with e.g. QPSK, 16 QAM, 64 QAM or higher modulation order allowing higher data rate per sub-carrier. The subchannels allocation to a user consists either in consecutive subchannels allocation in a part of the frequency domain of the system also called frequency selective allocation or in single subchannels spread over the entire frequency band of the system called frequency diverse allocation or PUSC in the context of WIMAX.

In such OFDM systems, the sub-carrier frequencies can be allocated to a user channel on a short term basis (e.g. all 2 ms) as well the modulation order per sub-carrier defining a transmission channel for each user should be updated on the same short term basis.

There are different ways to increase the overall throughput of the system.

Firstly, an efficient sub-carrier/modulation allocation should be performed to the different users, i.e when the best appropriate sub-carriers are identified for a user, the optimal modulation to be used on these sub-carriers should be appropriately selected. The higher modulation orders can only be used if the signal to noise ratio (SNR) at the receiver is high enough to allow the demodulation. Secondly, MIMO techniques increase the throughput by providing for 2 or 4 transmit/receive antennas which can operate in parallel.

In all these prior art systems, the decoding at the receiver is based on the fact that the users are using different resources in time, frequency and or code, so that the decoder at the receiver first apply the decoding in knowledge of the resource used by the different users.

A particular object of the present invention is to provide a method for receiving and decoding reliably signals which provide for a further increase of the throughput in a wireless communication system.

Another object of the invention is to provide a corresponding receiver.

SUMMARY OF THE INVENTION

These objects, and others that appear below, are achieved by a method for decoding a composite radio signal at a receiver, said composite radio signal (Scombined) being a superposition of at least two signals sent by at least one transmitter, each signal having signal properties, in particular modulation scheme, coding scheme, pilot pattern, subcarrier mapping between physical and logical channels, said at least two signals being transmitted using the same radio resource, and a receiver to be used in a wireless communication system for decoding a composite radio signal, said composite radio signal being a superposition of at least two signals, each signal having signal properties, in particular modulation scheme, coding scheme, pilot pattern, subcarrier mapping between physical and logical channels, said at least two signals being transmitted using the same radio resource.

In order to further increase the capacity of the system, the signals from different users are superposed and transmitted using the same radio resource forming a composite radio signal, the receiver has the task to decode all the signals comprised in the composite radio signal using the signal parameters of the different superposed signals composing the composite signal in order to separate efficiently the signals at the receiver.

The method according to the present invention presents the advantage to reliably decode a signal comprising a superposition of signals using the same resource.

In a preferred embodiment of the present invention, the method is used in combination with frequency diverse resource allocation for the superposed signal, this presents the advantage that a rather constant channel path loss is obtained. Starting from this rather constant path loss the receive power at the receiver can be estimated it in a central entity and forwarded through signaling to the receiver for performing the method. This does not require any additional measurements at the receiver. In this case, no instantaneous channel state information at the receiver is required, only information on channel statistics (e.g. average channel gain (path loss)) are needed. This contributes a reduction of the complexity of the method. Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF PREFERRED EMBODIMENTS

Figure 1:
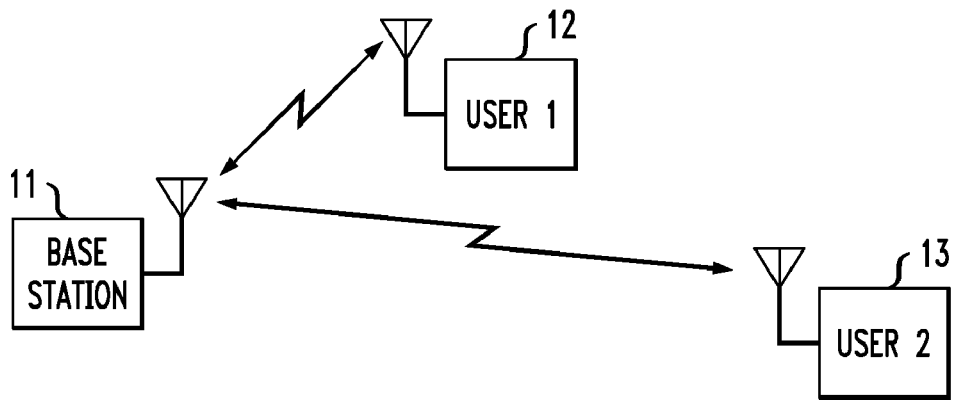
FIG. 1 shows a simplified system in which the present invention can be implemented.

FIG. 1 shows a simplified system in which the present invention can be implemented. This system comprises a base station 11 and two users 12, 13. Users 12 and 13 communicate with base station 11. The present invention can be used for uplink communication where users 12 and 13 work as transmitters and base station 11 works as receiver as well as for downlink communication where users 12 and 13 work as receiver and base station 11 work as transmitter.

According to the present invention, users 12 and 13 share the same resource during at least one predefined period of time. Applied to an OFDM system, this means that the two users send/receive signal to/from base station 11 on the same frequency sub carriers and during the same time slots of the OFDM frames during the predefined period of time. The selection of the users which have to share the same resource is performed centrally by the resource allocation module using algorithms which are out of scope of the present invention. It is the object of the present invention to propose a method for separating the superposed received signals referred as the composite radio signal at the receiver although no usual hard separation mechanism (as well known FDMA, TDMA, CDMA) is available.

According to the present invention, the signals emitted/destined to user 12 respectively user 13 have specific signal properties among which we can enumerate the coding scheme C12, C13, the modulation scheme M12, M13, pilot pattern (PP1, PP2), subcarrier mapping between physical and logical channels (SM1, SM2). These signal properties, or a subset of them, must be known or forwarded to the receiver which will use them for performing the decoding steps according to the present invention and separating the two signals. The signal properties are either send over signaling to the receiver (e.g. in downlink direction) or over some internal interface (e.g for the uplink direction in the BS). Among all the communicated signal properties the receiver will select the relevant ones.

In a very simple embodiment of the present invention, the decoding sequence for the different signal is decided outside of the receiver and signaled to the receiver by a central entity in the cell (e.g. a base station). In another embodiment of the present invention, the receiver is able to get information on the receive power of the different superposed signals. A possible method for this could consists in measuring the receive power for the pilot tones contained in the different signals of the composite signal. Alternatively, the signal properties including the receive power can be estimated by the system and forwarded to the receiver, so that no measurements at the receiver are required. Only instantaneous power may be measured for equalization purpose. The receiver will then be able to calculate a robustness criterion based on the signal properties and on the receive power and define the decoding sequence.

In a further embodiment of the present invention, the receiver get information on the transmit power of the different signals of the composite signal and calculates an estimation of the received power based on that transmit power and on the path loss. This is especially advantageous when the PUSC mode is used since the path loss changes slowly and can be reliably signaled to the receiver. The same robustness criterion can be calculated and used to determine the best decoding sequence.

It will be clear for a person skilled in the art that the present invention may be used for more than two users communicating with a base station using simultaneously the same resource. It will also be clear for a person skilled in the art that a single user may generate two or more signals e.g. through two or more antennas that may be separated at a base station using the method according to the present invention.

Figure 2:
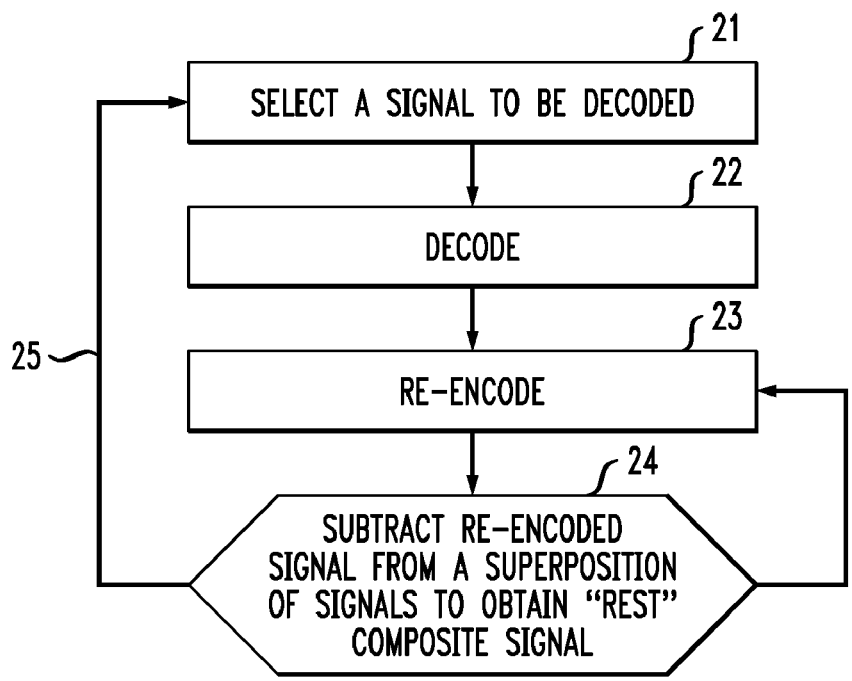
FIG. 2 shows the different steps of the method according to the present invention.

FIG. 2 shows the different steps of the method according to the present invention.

Assumed, the receiver has knowledge of the signal properties as well as of the transmit and receive power of the different superposed signals as already described above, the received has to perform following steps:

Step 21 consists in selecting, depending on said signal properties (modulation, coding scheme, pilot pattern, subcarrier mapping between physical and logical channels) of said respective signals composing the composite radio signal, the signal to be decoded first.

Step 22 consists in decoding said signal to be decoded first according to its signal properties the rest of the signal being considered as noise.

Step 23 consists in re-encoding the decoded signal using the same signal properties Step 24 consists in subtracting the re-encoded signal from the superposition of signals to obtain a "rest" composite radio signal which can be used to decode additional superposed signals.

Step 25 consists in repeating steps 21-24 for the rest signal as long as signals from the superposition signal remains to be decoded.

In a preferred embodiment of the present invention, an iterative process may be used in order to refine the decoding. For example, once all signals have been decoded, the rest signal which would constitute the noise may be subtracted from the initial composite radio signal and a new iteration may be performed, decoding again the superposed signals. This would enable to obtain a better reliability of the decoding.

In a further preferred embodiment of the present invention, the iterative process may consists in, after having decoded the first and the second signals as described above, decoding the first signal again after having subtracted the contribution of the second signal from the composite signal. The new decoded first signal is subtracted from the composite signal so that the second signal can be decoded again and so on. This iterative process further refine the accuracy of the decoding. This method can be used for more than 2 superposed signals.

In a preferred embodiment of the present invention, the frequency subchannels used for transmitting the different signals composing the composite signal are chosen so as to provide frequency diversity on the frequency band of the system. Especially, a PUSC (Partial usage of subChannels) subchannel allocation is advantageous in the context of a WIMAX system.

This frequency diverse subchannel allocation has the specificity that the subchannel allocated to the superposed users are well spread over the frequency band of the system so that in total the superposed signals are not so influenced by sudden channel changes. Even if the channel gets bad on certain frequency channels, this can be mitigated by the fact that other frequencies allocated for the transmission are still experiencing good channel conditions. This is especially advantageous when determining an average channel pathloss since a pathloss calculated over spread frequencies tends not to vary in a broad range contrary to what would happen in a narrow range of frequency which may be shortly affected by high channel attenuation.

In addition, the use of the decoding method according to the present invention in a frequency diverse resource allocation further presents the advantage that the rather constant value of the path loss enables it to better predict the receive power at the receiver so that the value of the receive power do not needs to be measured at the receiver but may be determined by calculation either at the receiver or at a central entity of the network and sent by signaling to the receiver.

In order for the receiver to be able to decode frequency diverse subchannel allocation, a specific module for extracting and bringing together the allocated frequencies before decoding the signal. This module is preferably located after the FFT operation in the decoding chain.

Figure 3:
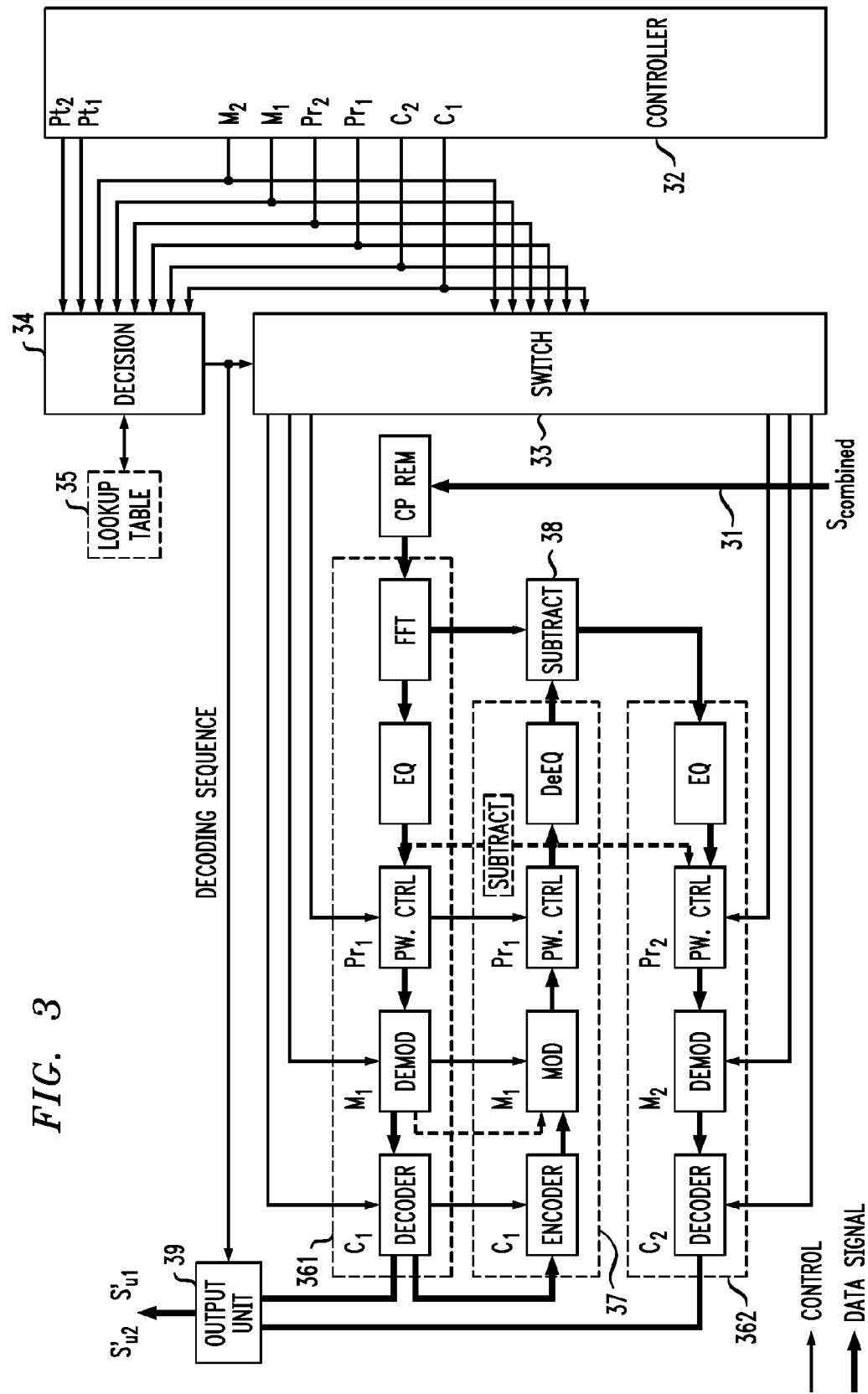
FIG. 3 shows an implementation of a received according to the present invention.

FIG. 3 shows an implementation of a receiver according to the present invention.

The receiver comprises an input unit 31, a controller unit 32, a switch unit 33, a decision unit 34, a lookup table 35, a decoding unit 361, 362, a reencoding unit 37, a subtracting unit 38, an output unit 39.

The input unit 31 which is fed with the composite radio signal is connected to decoding unit 361 connected to both output unit 39 and reencoding unit 37 which is itself connected to the subtracting unit 38 which is connected to a further decoding unit 362. Decoding unit 362 is finally connected to output unit 39. The signals exchanged in this chain are user data.

In addition, controller 32 is connected to decision unit 34 which is connected to lookup table 35. The decision unit 34 is further connected to switching unit 33 which is connected to decoding units 361, 362. The signals exchanged in this chain are control signals.

In the present embodiment, the signals of two users have been superposed, these two users are using the same coding schemes, the same modulation schemes and the same transmit power. The same receiver structure may nevertheless be applied in case more than 2 users are superposed in the signal.

It will be understood by a person skilled in the art that decoding unit 361 comprises preferably the entire processing sequence usually performed at a receiver starting after the FFT operation and ending at the user data sequence. This chain contains a FFT operation, a power control operation which scales the signal based on power knowledge at the receiver. This functionality may also be found directly in the equalizer, an equalization operation, a demodulation operation, a decoding operation in the narrow sense of the term (channel decoding, error correction) until a binary user sequence is available. Decoding unit 362 does preferably not comprise the FFT operation since it treats a signal which has already been submitted to FFT.

Similarly, re-encoding unit 37 is the counterpart to decoding unit 361, 362 and preferably comprises an encoder in the narrow sense of the term (channel encoding), a modulator, a de-equalizer which exactly performs the inverse operation than the equalizer of decoding unit 361 and a power control unit. The de-equalizer takes channel information (channel estimates in the proposed setup) and a signal to apply the impact of the channel on this signal. In the frequency domain of the OFDM transmission system this could be the multiplication of each subcarrier by its frequency domain channel estimate. Reencoding unit 37 does preferably not contain the IFFT operation since the signal at the output of the reencoding unit 37 is forwarded without IFFT to decoding unit 362 which itself does not contain the FFT operation. This presents the advantage to save an IFFT operation immediately followed by an FFT operation.

In case a frequency diverse allocation scheme is used for the frequency allocations of the superposed signals, a module performing a permutation of subcarriers (e.g. PUSC) has to be inserted before the FFT module in the decoding chain in order extract the assigned frequency subchannels and to bring them together for further processing.

Controller unit 32 comprises information on all signal properties used in the system by the different users as the modulation schemes, the coding schemes, pilot pattern, subcarrier mapping between physical and logical channels and depending on the embodiment either the transmit power for the different users or the receive power for the different users. The controlling unit is further aware of the number of the users in the system. These information are forwarded by the system or alternatively by the user terminals through signaling to controller 32. Especially, the receive powers are collected from a measuring unit.

Decision unit 34 is responsible to determine the decoding order of the different superposed user signals in the composite radio signal received at the receiver. Decision unit 34 bases preferably its decision on a metric which is based on the robustness of each user's signal. For this purpose, look up table 35 comprises a mapping of SNR (signal to noise ratio) versus BER (bit error rate) values for each possible modulation and coding schemes used in the system. As discussed above in comfination with FIG. 1 the decision unit may not be part of the receiver but may be part of a central instance in the cell which signal the decoding sequence to the receiver. The criteria for this remote decision units to decide on the decoding sequence are nevertheless identical (robustness) as the ones used in case the decision unit is located in the receiver. In this case not showed in FIG. 3, the receiver does not comprise any decision unit but only signaling information triggering it to decode in a predefined decoding sequence.

Coming back to the embodiment of the receiver containing a decision unit 34, for each user superposed in the composite signal, the SNR value corresponding to its modulation and coding scheme is read out of the look up table 35 and is this target SNR value (in dB) is subtracted from the current SNR for this user. This metric results in that the bigger the value, the more robust the signal. Consequently, the user with the highest value is selected as the user that will be decoded first out of the composite signal. As already mentioned other robustness criteria may be used.

For example, the robustness criterion may be based on an estimation of the expected bit error rate based on the information about the receive power, and of the signal properties. The lower the expected error rate, the higher the robustness. The signal showing the highest robustness being decoded first.

The identification of the user to be decoded first is transferred to the switching unit 33 which has the task to parameterize the decoding unit 361 with the correct coding scheme, modulation scheme and receive power value stored for the user to be decoded first at controller unit 31.

The composite signal is forwarded to decoding unit 361 which has been parametrized to decode the user to be decoded first at identified by decision unit 34. The output of decoding unit is forwarded to identification unit 39 which identifies the signal corresponding to the first user to decode. Identification unit 39 having received from decision unit 34 the user decoding sequence, knows that the output from decoding unit 361 is the binary data of user 1 and labels it accordingly for upper layers.

The signal at the output of decoder 361 is re-encoded at re-encoding unit 37. The re-encoded signal corresponding to the signal of the first user to decode as identified by decision unit 34 is subtracted from the composite signal 31 in order that the remaining signal at the entry of decoding unit 362 no more contains contribution of the signal of the first user to decode. The remaining signal is submitted to decoding unit 362 which is identical to decoding unit 361 expect that no more FFT is necessary. Decoding unit is parameterized with the signal property of the next user to detect identified at decision unit 34. Consequently, the receive power for the second signal to detect as well as its coding and modulation schemes are mentioned by switch 33 to decoding unit 362. At the input of decoding unit 362 the signal is sent to identification unit 39 in order to recover the data sent by the second user to decode.

It will be understood by a person skilled in the art that there is no need to have two distinct decoding units 361 and 362. A unique decoding unit may be sufficient the remaining signal at the output of subtracting unit 38 being fed at the entry of decoding unit 361 for the decoding of the second user.

The described receiver was described in the context of uplink transmit direction from a user terminal to a base station of a wireless communication system. It will be understood by those skilled in the art that a similar receiver structure may be used for the downlink direction, from a base station to end users of a wireless communication system. In this case the presented receiver structure may be somewhat simplified since the channel conditions at the transmitter (BS) are the same for all superposed signals. In case signals of two users are superposed in a composite signal, this composite signal being sent by a base station and received at a receiver of one of the two users has experienced the same channel conditions. At the receiver, the channel is consequently estimated only once based on one single pilot pattern. The channel can be equalized in the first equalizer in module 361 of the decoding chain. No de-equalisation module in re-encoding unit 37, as well as no equalizer in decoding unit 362 are necessary. The simplified downlink path is shown with dashed lines in FIG. 3.

It will be further understood by a person skilled in the art that this method is not limited to the decoding of two superposed users. A higher number of superposed users can be decoded using the same principle: the contribution of all previously decoded users is subtracted from the composite signal and a new iteration of decoding to identify an additional superposed user is done.

It will further be understood by those skilled in the art that the method and receiver according to the present invention may be applied in other wireless networks than OFDM network. The main feature of the invention is the fact that several signals are superposed on the same resource but still can be decoded properly. This applies to any kind of resource time, frequency or code.

The invention claimed is:

1. A method for decoding a composite radio signal at a receiver in a radio communication system, said composite radio signal being a superposition of at least two signals sent by at least one transmitter, each signal having signal properties, said signal properties including at least one of a modulation scheme, a coding scheme, a pilot pattern, and a subcarrier mapping between physical and logical channels, said at least two signals being transmitted using the same radio resource, said method comprising:
    gathering information on said signal properties of the respective signals comprised in said composite radio signal;
    selecting, depending on said signal properties of said respective signals, the signal to be decoded first out of said composite radio signal depending on a function of a bit error rate threshold, a modulation and coding scheme used for said signal and of a signal receive power at said receiver;
    decoding said signal to be decoded first according to its signal properties; and
    subtracting the contribution of said signal to be decoded first from said composite radio signal.

2. The method according to claim 1, wherein the set of frequency subchannels assigned for transmitting said superposed signals are spread over the frequency band of the system, said method comprising a step of extracting the assigned frequency subchannels before the step of decoding.

3. The method according to claim 1, wherein said signal receive power is measured at the receiver.

4. The method according to claim 1, wherein said signal receive power is determined at a central entity of the network based on estimations from the path loss and on the signal transmit power.

5. The method according to claim 1, wherein said function depends on the difference between a Signal to Noise Ratio corresponding to said bit error rate threshold and an effective Signal to Noise Ratio at said receiver.

6. The method according to claim 1, wherein the signals contained in said composite radio signal signals are decoded one after the other following a predefined order, the composite radio signal used as basis for decoding of the next signal being the difference between the previous composite radio signal and the contribution of the signal previously decoded.

7. The method according to claim 1, adapted to be used in an OFDM based wireless/mobile communication network.

8. The method according to claim 1, wherein said composite radio signal is a superposition of the at least two signals sent by the at least one transmitter over a single antenna.

9. The method according to claim 1, wherein the signal to be decoded first is selected based at least partially on said signal properties of said respective signals and on a signal receive power.

10. The method according to claim 9, wherein said signal receive power is determined based on estimations from a path loss and on a signal transmit power, and wherein said signal receive power is forwarded to said receiver.

11. A receiver to be used in a wireless communication system for decoding a composite radio signal, said composite radio signal being a superposition of at least two signals, each signal having signal properties, said signal properties including at least one of a modulation scheme, a coding scheme, a pilot pattern, and a subcarrier mapping between physical and logical channels, said at least two signals being transmitted using the same radio resource, said receiver comprising:
    a controller unit operative to gather information on said signal properties of the respective signals comprised in said composite radio signal;
    a decoding unit operative to decode said composite radio signals in a predetermined decoding sequence;
    a decision unit operative to determine, depending on said signal properties of said respective signals, a decoding sequence for the signals contained in said composite radio signal, wherein said decision unit is operative to select a signal of said composite radio signal to be decoded first based at least partially on said signal properties of said respective signals, a bit error rate threshold, a modulation and coding scheme used for said signal, and on a signal receive power; and
    a subtracting unit operative to subtract the contribution of one signal from said composite radio signal.

12. The receiver according to claim 11, further comprising a reencoding unit operative to reencode the signal decoded at said decoding unit, said reencoded signal corresponding to the contribution of said decoded signal in said composite signal, said output of said reencoding unit being submitted to said subtracting unit.

13. The receiver according to claim 11, wherein said signal receive power is determined based on estimations from a path loss and on a signal transmit power, and wherein said signal receive power is forwarded to said receiver.

14. The receiver according to claim 11, comprising a decision unit operative to select a signal of said composite radio signal to be decoded first based at least partially on said signal properties of said respective signals and on a signal receive power, wherein said signal receive power is determined based on estimations from a path loss and on a signal transmit power, and wherein said signal receive power is forwarded to said receiver.

15. A method for decoding a composite radio signal at a receiver in a radio communication system, said composite radio signal being a superposition of at least two signals sent by at least one transmitter, each signal having signal properties, said signal properties including at least one of a modulation scheme, a coding scheme, a pilot pattern, and a subcarrier mapping between physical and logical channels, said at least two signals being transmitted using the same radio resource, said method comprising:
   gathering information on said signal properties of the respective signals comprised in said composite radio signal;
   selecting, depending on said signal properties of said respective signals, the signal to be decoded first out of said composite radio signal;
   decoding said signal to be decoded first according to its signal properties; and
   subtracting the contribution of said signal to be decoded first from said composite radio signal;
   wherein the set of frequency subchannels assigned for transmitting said superposed signals are spread over the frequency band of the system, said method comprising a step of extracting the assigned frequency subchannels before the step of decoding.

16. A method for decoding a composite radio signal at a receiver in a radio communication system, said composite radio signal being a superposition of at least two signals sent by at least one transmitter, each signal having signal properties, said signal properties including at least one of a modulation scheme, a coding scheme, a pilot pattern, and a subcarrier mapping between physical and logical channels, said at least two signals being transmitted using the same radio resource, said method comprising:
   gathering information on said signal properties of the respective signals comprised in said composite radio signal;
   selecting, depending on said signal properties of said respective signals, the signal to be decoded first out of said composite radio signal;
   decoding said signal to be decoded first according to its signal properties; and
   subtracting the contribution of said signal to be decoded first from said composite radio signal;
   wherein the signals contained in said composite radio signal signals are decoded one after the other following a predefined order, the composite radio signal used as basis for decoding of the next signal being the difference between the previous composite radio signal and the contribution of the signal previously decoded.

17. The method according to claim 16, wherein several iterations of said decoding of the signals is performed.

18. A method for decoding a composite radio signal at a receiver in a radio communication system, said composite radio signal being a superposition of at least two signals sent by at least one transmitter, each signal having signal properties, said signal properties including at least one of a modulation scheme, a coding scheme, a pilot pattern, and a subcarrier mapping between physical and logical channels, said at least two signals being transmitted using the same radio resource, said method comprising:
   gathering information on said signal properties of the respective signals comprised in said composite radio signal;
   selecting, depending on said signal properties of said respective signals, the signal to be decoded first out of said composite radio signal;
   decoding said signal to be decoded first according to its signal properties; and
   subtracting the contribution of said signal to be decoded first from said composite radio signal;
   wherein said composite radio signal is a superposition of the at least two signals sent by the at least one transmitter over a single antenna.

19. The method according to claim 18, wherein the signal to be decoded first is selected based at least partially on said signal properties of said respective signals and on a signal receive power.

20. The method according to claim 19, wherein said signal receive power is determined based on estimations from a path loss and on a signal transmit power, and wherein said signal receive power is forwarded to said receiver.

* * * * *